(12) United States Patent
Eaves

(10) Patent No.: US 7,553,583 B2
(45) Date of Patent: Jun. 30, 2009

(54) SYSTEMS AND METHODS FOR CONSTRUCTING A BATTERY PACK

(75) Inventor: Stephen S. Eaves, Charlestown, RI (US)

(73) Assignee: Modular Energy Devices, Inc., Warwick, RI (US)

( * ) Notice: Subject to any disclaimer, the term of this patent is extended or adjusted under 35 U.S.C. 154(b) by 280 days.

(21) Appl. No.: 10/361,110

(22) Filed: Feb. 7, 2003

(65) Prior Publication Data

US 2003/0152830 A1 Aug. 14, 2003

Related U.S. Application Data

(60) Provisional application No. 60/355,883, filed on Feb. 11, 2002.

(51) Int. Cl.
*H01M 10/44* (2006.01)
*H01M 10/48* (2006.01)
*H02J 7/00* (2006.01)

(52) U.S. Cl. .............................. 429/61; 429/90; 429/62; 429/123; 320/122; 320/126; 320/134; 320/136; 320/154

(58) Field of Classification Search .................... 429/61, 429/62, 90, 92, 122, 149, 160
See application file for complete search history.

(56) References Cited

U.S. PATENT DOCUMENTS

| | | | |
|---|---|---|---|
| 3,778,634 A | 12/1973 | Hanrihan | |
| 4,061,955 A | 12/1977 | Thomas | |
| 4,143,283 A | 3/1979 | Graf | |
| 4,287,267 A | 9/1981 | Whittlesey et al. ............ 429/49 |
| 4,672,228 A | 6/1987 | Swoboda | |
| 4,673,826 A | 6/1987 | Masson | |
| 4,694,194 A | 9/1987 | Hansel | |
| 4,709,202 A | 11/1987 | Koenck | |
| 4,760,322 A | 7/1988 | Crampton | |
| 4,871,956 A | 10/1989 | Barrella | |
| 4,876,495 A | 10/1989 | Palanisamy | |
| 5,034,290 A | 7/1991 | Sands | |
| 5,103,156 A | 4/1992 | Jones | |
| 5,151,644 A | 9/1992 | Pearson | |

(Continued)

FOREIGN PATENT DOCUMENTS

EP 0 932 240 12/1998 ..................... 31/36

(Continued)

*Primary Examiner*—Patrick Ryan
*Assistant Examiner*—Keith Walker
(74) *Attorney, Agent, or Firm*—Michael de Angeli

(57) ABSTRACT

Methods and systems for constructing a battery, the battery including at least two energy storage sections connected in parallel to a common module power bus, the energy storage sections including at least one battery cell and at least one section disconnect device capable of disconnecting the at least two energy sections from the module power bus, and, a section protection device to control the section disconnect device based on data from the energy storage sections. In an embodiment, the battery can include at least two battery modules connected in series using an interlock signal, where the battery modules include a module protection device having an interlock signal controller and fault logic for controlling the interlock signal controller, such that the modules can control the interlock signal and hence a disconnect device that receives the interlock signal and is connected between the modules and a load and/or charger.

8 Claims, 4 Drawing Sheets

U.S. PATENT DOCUMENTS

| | | | |
|---|---|---|---|
| 5,153,496 A | 10/1992 | LaForge | |
| 5,168,206 A | 12/1992 | Jones | |
| 5,206,578 A | 4/1993 | Nor | |
| 5,218,284 A | 6/1993 | Burns et al. | |
| 5,227,259 A * | 7/1993 | Weaver et al. | 429/49 |
| 5,243,269 A | 9/1993 | Katayama | |
| 5,313,152 A | 5/1994 | Wozniak | |
| 5,422,558 A * | 6/1995 | Stewart | 320/120 |
| 5,498,950 A | 3/1996 | Ouwerkerk | |
| 5,504,415 A | 4/1996 | Podrazhansky et al. | |
| 5,539,297 A | 7/1996 | Fiebig | |
| 5,744,936 A * | 4/1998 | Kawakami | 320/120 |
| 5,948,556 A | 9/1999 | Hall | |
| 5,952,815 A * | 9/1999 | Rouillard et al. | 320/116 |
| 6,152,776 A * | 11/2000 | Ikeda et al. | 439/627 |
| 6,420,852 B1 * | 7/2002 | Sato | 320/134 |
| 6,465,986 B1 * | 10/2002 | Haba | 320/116 |
| 6,919,707 B2 | 7/2005 | Kawai | |

FOREIGN PATENT DOCUMENTS

| | | | |
|---|---|---|---|
| EP | 1 150 132 | 10/2001 | 31/36 |

* cited by examiner

Battery Pack

Battery Module

SYSTEMS AND METHODS FOR CONSTRUCTING A BATTERY PACK

CLAIM OF PRIORITY

This application claims priority to U.S. Pat. No. 60/355,883 entitled "Method and Apparatus for Reliable Parallel Operation of Battery Cells," filed on Feb. 11, 2002, naming Stephen Spencer Eaves of Charlestown, R.I. as inventor, the contents of which are herein incorporated by reference in their entirety.

BACKGROUND (1) Field

The disclosed methods and systems relate generally to multiple cell batteries and more particularly to methods and systems for connecting battery cells.

(2) Description of Relevant Art

There are a number of applications for batteries that cannot be served by off-the-shelf battery cell sizes as these applications may require a battery cell that is larger or of a different geometry than the available standard battery cell sizes. Designing and manufacturing a new battery cell can be expensive due to significant design and tooling costs. Additional costs include testing and evaluating the new battery cell's performance. The reliability of custom battery cells can be a concern because the battery cells are typically manually assembled, and may not have a long-term operational history and proving period. Some battery chemistries, such as Lithium-ion (Li-ion), have a flammable electrolyte, and can pose a safety hazard if the battery cell is overcharged or otherwise abused. Making the battery cells in very large sizes places a larger amount of potential energy in one battery cell, making the larger battery cell a higher risk than the smaller, commercial battery cells.

A number of high volume manufacturers manufacture small battery cells in standard sizes. For example, a 18650 battery cell format is a common battery cell used in laptop computers, cellular phones, and other small portable equipment. The 18650 battery cell format is available for the Nickel metal-hydride and Lithium-ion chemistries. It is estimated that there are over 700 million Lithium-ion battery cells made annually in the 18650 battery cell format. High volume, automated manufacturing, and competition help to maintain the 18650 battery cells at cost competitive prices and high quality. The small battery cells can also be considered as generally safe, since only a limited amount of energy is stored in a single volume, as opposed to the larger battery cells.

It is generally believed that parallel operation of battery cells is undesirable since the cells may not share the total battery current evenly, thereby increasing the possibility of overheating and damaging individual battery cells. A short circuit in one battery cell could be supplied by other battery cells that are connected in parallel with it, potentially causing a catastrophic failure. It is also generally believed in the industry that increasing the number of battery cells in a battery pack can be detrimental to battery pack reliability because of an increase in overall parts count.

One prior art system discloses an architecture that includes connecting battery cells in parallel, where each battery cell has over-current and over-temperature protection. A disadvantage of this system is the inability of the architecture to tolerate a battery cell with a high resistance short, sometimes referred to as a "soft" short. In this type of failure, a battery cell loses its ability to maintain charge during extended standing periods. In a parallel arrangement, the battery cell with the soft short not only dissipates its own charge, but also dissipates the charges of the battery cells connected in parallel with the soft short cell. The current flow due to the soft short may not be large enough to activate the over-current mechanisms described in the prior art system, nor does such soft short condition produce enough heat to activate an over-temperature mechanism.

Another possible failure mode in a prior art system is a short circuit current that can activate a battery cell's Polymeric Positive Temperature Coefficient (PPTC) circuit protection device, but not a series fuse. The PPTC is a common component in lithium-ion battery cells that requires a small amount of heating current while the short is present, and drains the battery cells of their energy while the battery is in an idle state. In the prior art systems, the occurrence of a soft short may completely disable the battery pack over an extended time.

SUMMARY

The disclosed methods and systems include a method for constructing a battery, including providing at least one module by connecting at least two energy storage sections in parallel to a common module power bus, the energy storage sections having at least one battery cell and at least one section disconnect device to disconnect at least one of the energy storage sections from the common module power bus, acquiring data associated with the battery cell(s) in the energy storage sections, and, based on the data, controlling the section disconnect device to disconnect one or more of the energy storage sections from the module power bus.

Acquiring data can include acquiring data associated with battery cell voltage, battery cell temperature, and/or battery cell current. The acquiring can include acquiring using a section protection device, where the section protection device can compare the acquired data against at least one predetermined value. In an embodiment, the section disconnect device can be thermally activated, and in one embodiment, can include a resistive heating device. The section disconnect device may be activated by an electrical current.

The energy storage sections can include an equalizer device and/or circuit for directing energy from the battery cell output terminals to an electrically resistive device. The directing can be based on a predetermined battery cell voltage setting.

The method can include connecting the module(s) in series. The modules can be associated with at least one module protection device and/or circuit for monitoring and/or receiving associated with a voltage, a temperature, and/or a current based on the module(s). The method can also include comparing the received data to at least one threshold, and based on the comparison, controlling an interlock signal that connects the series connected modules. The interlock signal can control a pack disconnect device to disconnect the battery module from a charge source and/or a load. In one embodiment, the energy storage sections can include at least one fuse.

In one embodiment, the method includes providing battery cell protection devices for at least one of the at least one battery cells.

Also disclosed is a battery having at least two energy storage sections connected in parallel to a common module power bus, the at least two energy storage sections including at least one battery cell and at least one section disconnect device capable of disconnecting at least one of the at least two energy sections from the module power bus, and, a section protection device to control the section disconnect device based on data from the at least two energy storage sections. The data can include and/or be associated with at least one of a temperature, a voltage, and a current. The battery cell(s) can be connected in a series-parallel arrangement, and the section protection device can compare at least one of a temperature, a voltage, and a current to at least one predetermined value to control the section disconnect device. The predetermined value can vary, and/or may be fixed.

The section protection device can be associated with at least one of the energy storage sections. The disconnect device can be thermally activated, and in an embodiment, can be activated by providing electrical current to a resistive heating element.

The energy storage sections can include at least one equalization device, where the equalization device(s) and/or circuit can compare the at least one battery cell voltage to a predetermined voltage setting, and based on the comparison, direct energy from the battery cell(s) to an electrically resistive device. The battery can include a module protection device, where the module protection device can include fault logic and an interlock signal control, the fault logic for providing control to the interlock signal control.

Also disclosed is a battery having at least two battery modules connected in series using an interlock signal, the at least two battery modules including a module protection device, where the module protection device includes an interlock signal controller and fault logic for controlling the interlock signal controller, at least two energy storage sections connected in parallel to a common module power bus, the at least two energy storage sections including at least one battery cell and at least one section disconnect device capable of disconnecting at least one of the at least two energy sections from the module power bus, and, a section protection device to control the section disconnect device based on data from the at least two energy storage sections. The battery can include a pack disconnect device connected in series to the interlock signal, the pack disconnect device connected between the at least two battery modules and a load and/or a charger. The interlock signal can control the pack disconnect device. The module protection device for the battery module(s) can control the interlock signal to cause the pack disconnect device to disconnect the load and/or the charger from the battery module(s).

Other objects and advantages will become apparent hereinafter in view of the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed method and systems include a method for connecting battery cells to provide a battery module architecture, where the architecture includes two or more energy storage sections connected in parallel, where an energy storage section includes one or more battery cells. The energy storage sections also include at least one thermal protection device, and at least one over-current protection device. In some embodiments, one or more of the over-current protection devices may be integrated with and/or contained within the battery cells. Accordingly, it can be understood that some battery cells include over-current protection devices as provided from the battery cell manufacturer. An energy storage section can also include at least one section disconnect device that can disconnect the energy storage section from the battery module power bus based on a determination that the energy storage section may be faulty and/or degrading the battery module's performance, and/or if one or more of the battery cells in the corresponding energy storage section may be in danger of severe damage.

The disclosed methods and systems also provide that when two or more battery modules can be placed in series to form a battery pack, and the battery modules may be provided with a module protection device and/or circuit that can, in one embodiment, receive data to monitor and/or compare a current, temperature, and/or voltage across a corresponding battery module to determine if it is, for example, within a predetermined operating window (e.g., approximately thirty volts). The module protection circuit may thus monitor battery module temperature and battery module current. In an embodiment, the module protection circuit can control an interlock signal that may activate a disconnect device that can interrupt the battery module connection to a charge source and/or load.

Figure 1:
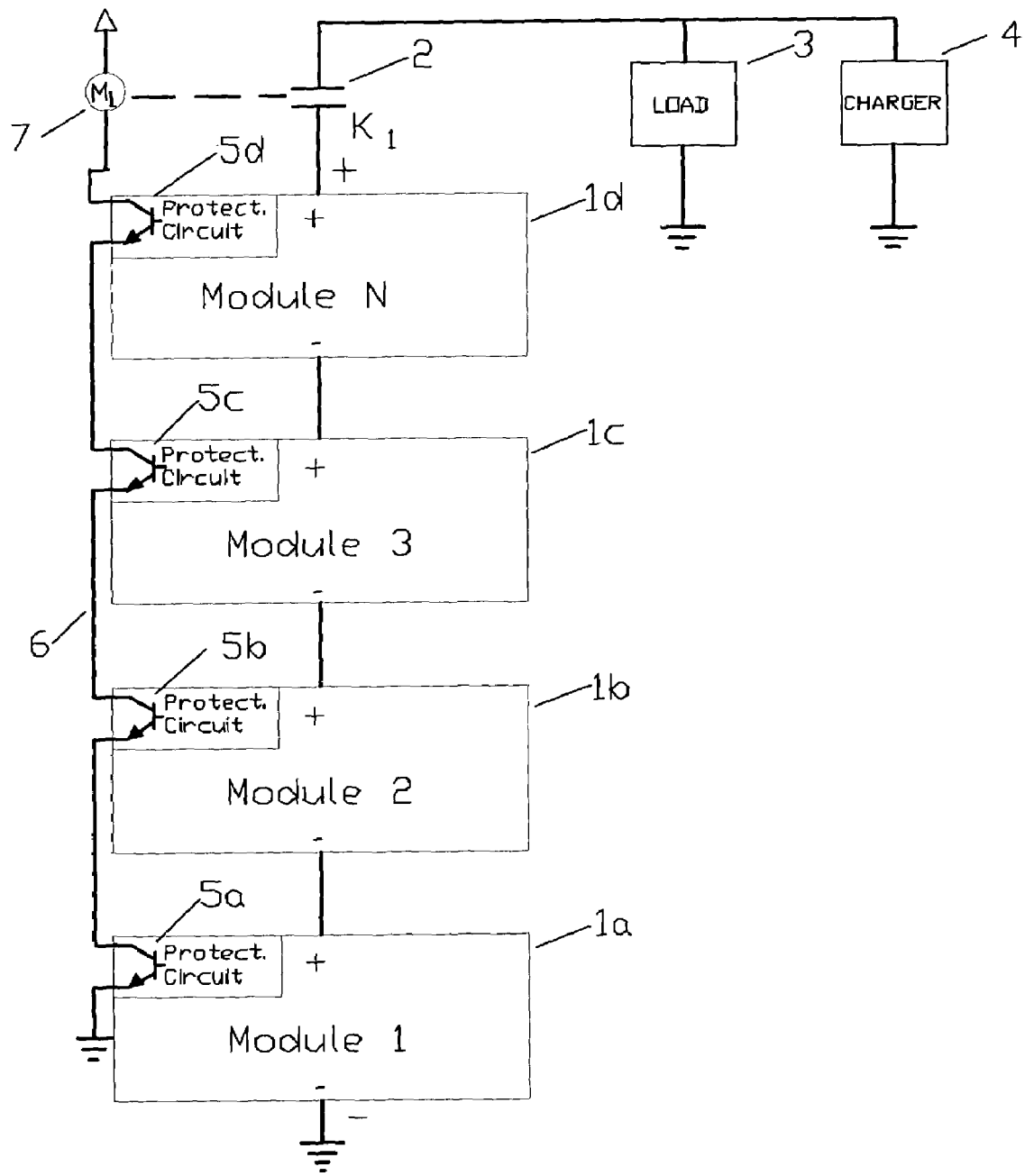
FIG. 1 is a diagram of an exemplary battery pack.

Accordingly, with reference to FIG. 1, it can be understood that battery modules 1*a*-*d* can be connected in series to create battery pack ("pack") having a voltage that is based on the voltages of the battery modules 1*a*-*d*. A pack disconnect device 2 can be connected in series with the battery pack and can interrupt the battery pack connection to a load 3 and/or charge source 4. The pack disconnect device 2 can be opened and/or otherwise activated by battery module protection circuitry 5*a*-*d* that can optionally reside in the battery modules 1*a*-*d*, where the module protection circuitry 5*a*-*d* can determine whether a corresponding battery module 1*a*-*d* is operating in accordance with predetermined operating conditions. The connection between the modules 1*a*-*d* and the disconnect device 2 may be analog, digital, or a combination, and can include software, and accordingly, the disconnect device 2 may be analog and/or digital. Accordingly, based on the predetermined operating conditions and data from the modules 1*a*-*d*, a battery module protection circuit 5*a*-*d* can alter the continuity of an interlock signal 6 that can be connected in series to battery modules 1*a*-*d*. For the illustrated embodiment, when a battery module protection circuit 5*a*-*d* interrupts the continuity of the interlock signal 6, a disconnect device actuation circuit 7 can be altered, and the illustrated pack disconnect device 2 can disconnect the battery pack from the load 3 and/or charge source 4. Those of ordinary skill will understand that the disclosed methods and systems are not limited to four battery modules as provided in FIG. 1, and hence, the use of the variable N in FIG. 1, and in other Figures, is intended to represent an integer number greater than zero. Similarly, the disconnect device actuation circuit 7 can be analog and/or digital, and although the illustrated system indicates a separate module protection circuit 5a-d for the battery modules 1a-d, in some embodiments, a single module protection circuit 5a-d may receive data from multiple battery modules 1a-d. It can be understood that references herein to module protection "circuitry" 5a-d can be understood to refer similarly to a module protection "device" that can include analog and/or digital hardware and/or software.

Figure 2:
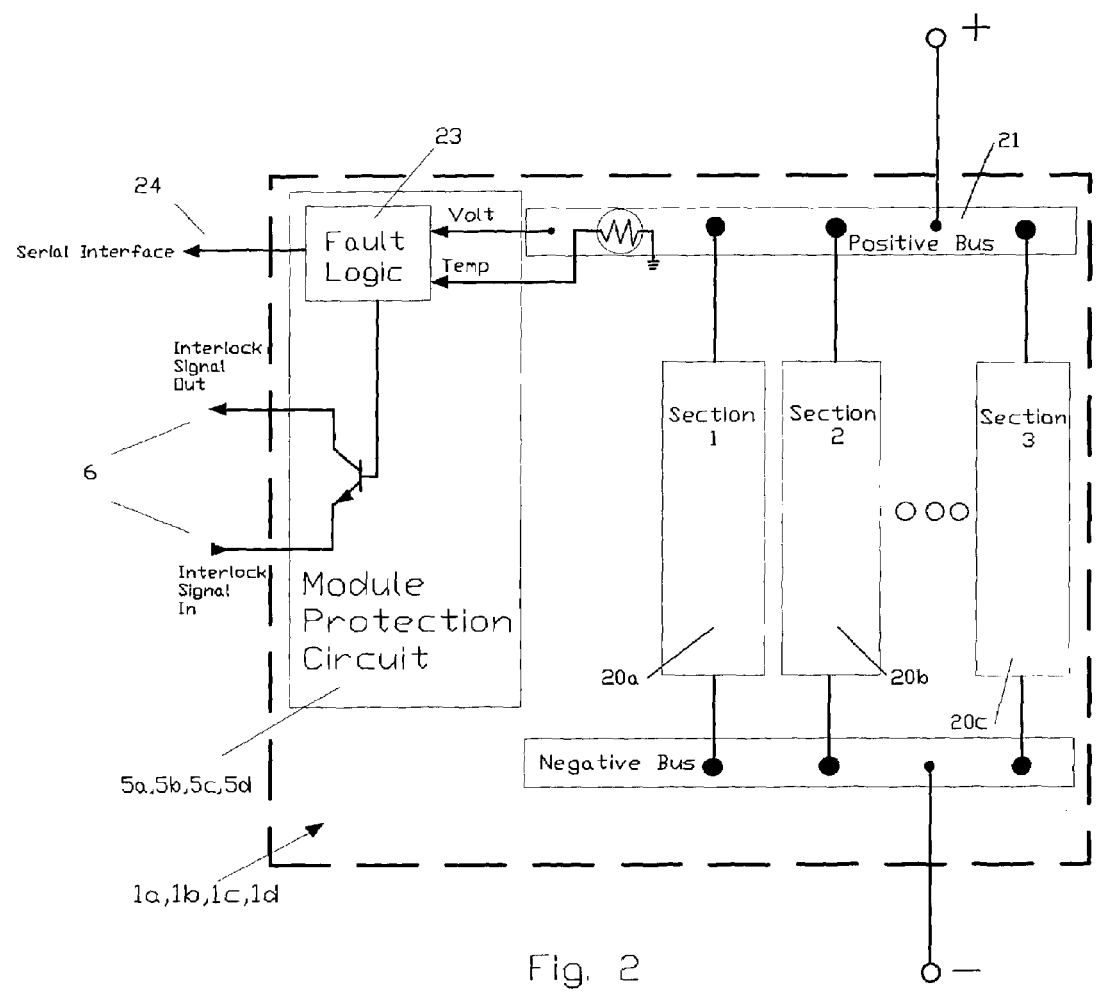
FIG. 2 is a block diagram of an exemplary battery module.

FIG. 2 illustrates a battery module 1a-d according to FIG. 1, where the illustrated modules include one or more energy storage sections 20a-c connected in parallel to a battery module power bus 21. As will be provided herein, the illustrated battery module power bus 21 can be monitored by a module protection circuit 5a-d according to FIGS. 1 and 2. The illustrated module protection circuit 5a-d can include fault detection circuitry/logic 23 that can interrupt the continuity of the interlock signal 6 if a battery module data measure and/or parameter is determined to be outside of predetermined suitable operating ranges. As indicated in FIG. 2, the fault detection logic 23 can receive data, measures, and/or parameters that are based on data from the energy storage sections 20a-c. Such data can include, for example, voltage and/or temperature data.

Figure 3:
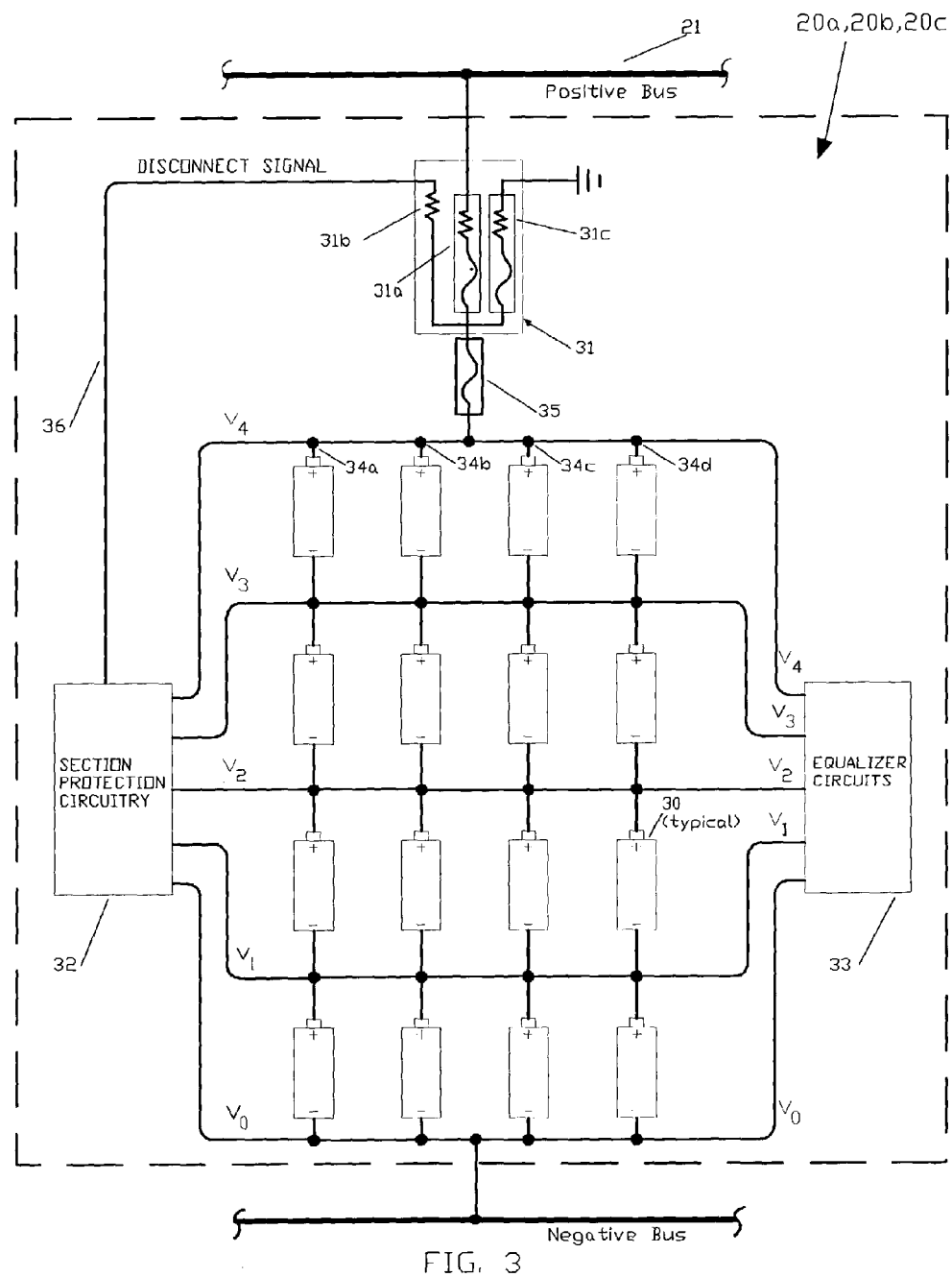
FIG. 3 is a block diagram of an exemplary energy storage section for a system and method according to FIG. 2; and,
FIG. 4 is a one illustrative diagram of a cell equalizer device according to FIG. 3.

FIG. 3 illustrates an exemplary energy storage section for one embodiment of the energy storage sections 20a-c according to FIG. 2. The FIG. 3 embodiment of the energy storage sections 20a-c includes one or more battery cells 30 connected in a series-parallel arrangement.

As shown in FIG. 3, the connection of the energy storage section 20a-c to the battery module power bus 21 can be controlled (e.g., interrupted) by a controllable section disconnect device and/or means 31 that can be activated by a section protection device/circuit 32. The section protection circuit 32 can be capable of determining whether one or more battery cells 30 within the illustrated energy storage section 20a-c satisfy a predetermined criteria that can be, for example, a failure criteria, although other criteria may be used based on the embodiment. The criteria can be provided such that section protection circuitry 32 can activate section disconnect 31 if the criteria is satisfied, and accordingly, the section protection device/circuitry 32 can include analog and/or digital hardware, and/or software. For example, in one embodiment, section protection circuitry 32 can activate the section disconnect device 31 when one or more of the battery cells 30 within the section have a terminal voltage that exceeds a predetermined value. Accordingly, other illustrative criteria can be based on whether there is data and/or evidence of actual and/or potential battery cell damage within an energy storage section 20a-c, if continued operation of an energy storage section 20a-c may be detracting from the overall performance of the module, etc. Accordingly, in some embodiments, a battery module 1a-d can contain or otherwise include a number of energy storage sections 20a-c such that performance may not be degraded beyond a predetermined criteria when an energy storage section 20a-c is disconnected from the module power bus 21.

In one embodiment, and as illustrated in FIG. 3, the section disconnect device/means 31 can be a controllable thermal cut-off (CTCO). The CTCO can be constructed using a conventional thermal cut-off (TCO) 31a that may be opened by energizing, for example, a heating resistor 31b via a disconnect signal 36 based on the section protection device/circuitry 32. After heating and opening the first TCO 31a, the heating resistor power 31b can be terminated by a second TCO 31c that can be set to a higher opening temperature than the first TCO 31a. The components of the CTCO 31 can thus be in thermal contact and may use a thermally conductive pad or potting compound.

Figure 4:
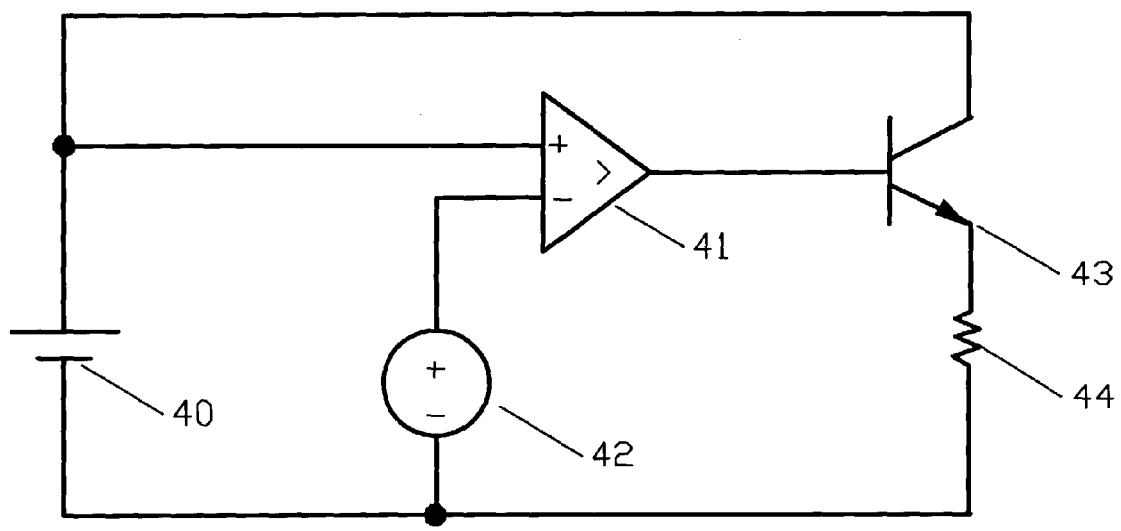

The FIG. 3 embodiment also includes an equalizer circuit 33 that can balance a state-of-charge between the series battery cells 30 within an energy storage section 20a-c for the purposes of better matching of cells' 30 charge and discharge characteristics. One exemplary embodiment for a passive equalizer circuit 33 as applied to a single cell is shown in FIG. 4. As FIGS. 3 and 4 indicate, an exemplary device such as a comparator 41 can sense when a cell 30a has or is otherwise associated with a terminal voltage that exceeds a predetermined voltage set-point, where such set-point can be set by a reference voltage source 42. When the set-point presented by the reference source 42 is exceeded, a field effect transistor (FET) 43, for example, can be enabled and/or otherwise turned on to provide and/or otherwise bypass charge current around the battery cell 30a, and into a resistor 44 and/or another device, to be dissipated as heat. Accordingly, at least a portion of an overcharging cell's energy can be dissipated to avoid damage. Those of ordinary skill will recognize that the methods and systems are not limited by the equalizer device/circuit 33 and/or components thereof, and that other analog and/or digital designs can be employed to provide the equalization as provided herein.

With further reference to FIG. 3, the arrangement of overcurrent and over-temperature protection within an energy storage section can depend on battery cell design and battery cell chemistry. For example, some small lithium-ion cells may be factory-equipped with a resetable, Polymeric Positive Temperature Coefficient (PPTC) fuse and/or an internal TCO that is not resetable. In such embodiments, the section protection circuitry 32 can be simplified. For example, in such an embodiment, section protection circuitry 32 can protect cells 30 from overcharge by activating the section disconnect device 31 when one or more cells 30 within a section 20a-c has a terminal voltage above a predetermined maximum value. With reference to FIG. 3 and in particular, with respect to battery cells 30 that do not include internal protection devices, example locations for the placement cell protection devices such as PPTC fuses are shown as 34a-d, and 34e, although those of ordinary skill will understand that other locations may alternatively and/or additionally be used. At least one thermal cut-off (TCO) can also be installed in an area and/or location that can be associated with a location having a relatively highest temperature.

The section protection device/circuitry 32 features may be expanded when cells 30 do not include or otherwise contain factory-equipped protection devices. For example, in an embodiment, the section protection circuitry 32 can protect battery cells 30 from overcharge and from over-temperature conditions by activating a section disconnect device 31 when one or more cells 30 within a section 20a-c has a terminal voltage above a predetermined value or one or more points within an energy storage section 20a-c are above a predetermined temperature value. The disclosed methods and systems can employ a positive temperature coefficient characteristic of one or more PPTC devices to protect cells 30 from overcurrent conditions and to balance current flow between parallel battery cell strings, these strings can be exemplified by the four series-connected battery cells 30 aligned vertically below points 34a-d of FIG. 3. When one string in a parallel group begins to support an unequal share of the load current, the PPTC resistance can increase for balanced operation.

Referring again to FIG. 3, a section can include one or more electrical fuses 35 to increase the current interrupt rating of the section disconnect device 31 since the interrupt rating of the PPTC devices within battery cells 30 or PPTC devices 34a-d in series with battery cells 30 may not sustain a short circuit current that may occur if there is a hard short in a battery cell 30 that is fed by multiple parallel energy storage sections 20a-c. The protection from the fuse 35 can be evaluated relative to possible permanent loss in battery output due to an opening of fuse 35 during a momentary short circuit across one or more modules 1a-d. In some battery powered systems, it may be desirable to risk the venting or even rupturing of one of the small cells rather than risk losing power from the entire battery.

Referring back to FIG. 1, the module protection circuitry 5a-d enables the connection of multiple battery modules 1a-d in series. As provided herein, the module protection circuitry can control the interlock signal 6 to open pack disconnect device 2 and at least interrupt the battery pack connection to the charger 4 and/or load 3. In an embodiment, the module interlock signal 6 can be indicative of a failure on module over-voltage, module under-voltage voltage, and/or module over-temperature.

Accordingly, the disclosed methods and systems offer a means to combine comparatively small battery cells to produce a large battery module, where the modules can be combined in series to provide a battery pack. A battery module can include at least two energy storage sections containing one or more battery cells. The module sections can be monitored and based upon such monitoring, can be electrically disconnected from a module internal power bus. As an option, the system may also contain equalization circuitry that can compensate for limited differences in state-of-charge between battery cells.

Although the illustrated embodiments refer to circuit/circuitry, it can be understood that the methods and systems described herein are not limited to a particular hardware or software configuration, and references to circuit, circuitry and/or modules can include analog and/or digital hardware, and/or software, and thus the disclosed methods and system may find applicability in many computing or processing environments. As such and as provided herein, the methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application.

Although the methods and systems have been described relative to a specific embodiment thereof, they are not so limited. Obviously many modifications and variations may become apparent in light of the above teachings. For example, when a section 20a-c of a battery module 1a-d is disabled by the section protection circuitry 32, the module energy and power capabilities may be reduced, although in some embodiments the sections can be sized to reduce the effect on the system operation. The impact on system performance can be further reduced by employing an active energy transfer device(s) which can move energy from stronger battery cells to weaker cells during battery pack operation. Such an energy transfer device(s) can be employed to move energy from battery modules 1a-d that contain more active sections 20a-c to those modules 1a-d with more disabled sections 20a-c during discharge. During charging, the active energy transfer device(s) can move energy from modules 1a-d with more disabled sections 20a-c to modules 1a-d with less disabled sections 20a-c to reduce the chance of lower capacity modules from overcharging.

The number of parallel battery cells and/or parallel battery cell strings in an energy storage section 20a-c can vary depending on the application/embodiment. For comparatively high power applications, for example, there may be as few as one parallel battery cell 30 and/or one battery cell string per energy storage section 20a-c. This scalability can reduce the need for very high current carrying capability for the section disconnect device 31 contained in each energy storage section. Further, cell protection device(s) 34a-d placement can vary within a section 20a-c. For example, PPTC devices 34a-d can be placed in series with battery cells 30, in series with parallel battery cell strings, and/or in series with an energy storage section 20a-c.

Although a controllable thermal cut-off was employed as a section disconnect device 31 in the illustrated embodiments, a relay or power semiconductor-based disconnect can also be used. A power semiconductor switch may also include thermal and over-current protection for the modules.

In some embodiments, the section protection circuitry 32 can be centralized and/or otherwise incorporated in the module 1a-d to allow a single protection circuit to manage a plurality of sections. In some embodiments, the section protection circuitry 32 can be placed outside the battery module and expanded in function to allow energy storage sections residing in separate battery modules to be managed and controlled by a single instance of the section protection circuitry 32.

Some embodiments may use the load device 3 and/or charger 4 to interrupt the charging and/or discharge current, rather than employing the illustrated disconnect device 2. For example, some power converters include enable inputs that can be connected to the module interlock signal 6.

Module Protection Circuitry 5a-d can be modified to include hardware and/or software that would allow a communication interface 24, shown on FIG. 2, to an external monitoring device such as an on-board computer/processor residing in an electric vehicle. The communication interface could relay module 1a-d operating conditions to the external monitoring device. Given sufficient communication speed, the interlock signal 6 could be optional since the external monitoring device could acquire module 1a-d operating data and timely open pack disconnect device 2 during specified operating conditions to disconnect the pack from the load 3 and/or charge source 4.

The battery pack may additionally and/or optionally include a series electrical fuse for over-current protection.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A battery pack comprising:
   at least one battery module connected to battery pack terminals, plural modules, if provided, being connected in desired configuration to achieve a desired voltage and current capability;
   each battery module comprising at least two energy storage sections connected in parallel across positive and negative module power buses,
   said battery pack further comprising module monitoring and protection circuitry for monitoring one or more of the voltage across, current through, or temperature of the module(s), and for providing an interlock signal that controls disconnection of the module(s) from at least one of a charge source and a load responsive to detection of a module fault, wherein said module monitoring and protection circuitry does not control connection of the individual energy storage sections to the module power buses;
   each energy storage section comprising:
   (1) at least four battery cells connected in at least two series-connected strings, each of the corresponding single cells of each string also being connected in parallel to form at least two cell groups, each cell group comprising at least two cells connected in parallel, whereby each cell group thus comprises single cells connected in parallel,
   (2) at least one device for monitoring the operation of the battery cells in each energy storage section, and for providing a disconnect control signal responsive to the operational state of the cells within the energy storage section, said at least one device being capable of separately monitoring each cell group of single cells connected in parallel, such that the cells of each cell group of single cells connected in parallel are monitored collectively; and
   (3) a controllable element for permanently disconnecting the entire energy storage section from the module power buses responsive to said disconnect control signal,
   wherein the only means for disconnecting the energy storage sections from the module power buses are comprised by the energy storage sections; and
   whereby the remaining energy storage section(s) continue to function to deliver energy upon disconnection of any of the other energy storage sections.

2. The battery pack of claim 1, wherein said device for monitoring the operation of the at least four battery cells of each energy storage section separately monitors at least one of voltage, temperature, or current of each of the cell groups of single cells connected in parallel.

3. The battery pack of claim 1, where the controllable element of each energy storage section is thermally activated.

4. The battery pack of claim 3, where the controllable element of each energy storage section includes a resistive heating device arranged to heat a first thermally-activated controllable cut-off device.

5. The battery pack of claim 4, wherein each controllable element further includes a second thermally-activated controllable cut-off device connected to cut off current to said resistive heating device after said first thermally-activated controllable cut-off device has been actuated.

6. The battery pack of claim 1, where each energy storage section further comprises a fuse, which is blown responsive to a current beyond its rating.

7. The battery pack of claim 1, where each energy storage section includes a circuit for comparing the voltage on said individual cell groups of single cells connected in parallel to a predetermined battery cell voltage or to one another, and an equalizer circuit for directing energy from at least one cell group of single cells connected in parallel to an electrically resistive device to better match the characteristics of the cell group of single cells connected in parallel to that of other cell groups of single cells connected in parallel within said energy storage section.

8. The battery pack of claim 1, wherein said battery pack has a minimum capacity rating, and the number of energy storage sections and their relative capacity are chosen correspondingly so that said battery pack is capable of supplying power at its rated capacity after permanent disconnection of at least one of said energy storage sections responsive to detection of a malfunction.

* * * * *